(12) United States Patent
Lee

(10) Patent No.: US 8,226,091 B2
(45) Date of Patent: Jul. 24, 2012

(54) ACTIVE GEOMETRY CONTROL SUSPENSION SYSTEM AND ACTUATING DEVICE DRIVING THE SAME

(75) Inventor: Un Koo Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 88 days.

(21) Appl. No.: 12/957,126

(22) Filed: Nov. 30, 2010

(65) Prior Publication Data

US 2011/0233880 A1  Sep. 29, 2011

(30) Foreign Application Priority Data

Mar. 29, 2010 (KR) .................. 10-2010-0028169

(51) Int. Cl.
*B60G 7/00* (2006.01)
*B62D 17/00* (2006.01)

(52) U.S. Cl. ............... 280/5.52; 280/5.522; 280/86.75
(58) Field of Classification Search .................. 280/5.52, 280/5.521, 5.522, 5.524, 86.75, 86.751, 86.753, 280/86.754, 86.755, 86.757, 86.758
See application file for complete search history.

(56) References Cited

U.S. PATENT DOCUMENTS

| | | | | |
|---|---|---|---|---|
| 5,549,319 A * | 8/1996 | Kring | ........................ | 280/86.75 |
| 6,352,272 B1 * | 3/2002 | Lee | ........................ | 280/124.134 |
| 7,111,849 B2 * | 9/2006 | Yun | ........................ | 280/5.52 |
| 7,621,539 B2 * | 11/2009 | Choi et al. | ........................ | 280/5.52 |
| 7,914,020 B2 * | 3/2011 | Boston | ........................ | 280/86.751 |
| 2006/0197301 A1 * | 9/2006 | Kunert et al. | ........................ | 280/124.165 |
| 2007/0080509 A1 * | 4/2007 | Kim | ........................ | 280/5.52 |
| 2011/0042907 A1 * | 2/2011 | Lee et al. | ........................ | 280/5.522 |

\* cited by examiner

*Primary Examiner* — Joseph Rocca

(74) *Attorney, Agent, or Firm* — Morgan, Lewis & Bockius LLP

(57) ABSTRACT

An actuating device for an active control suspension system which is provided at both ends of a sub-frame of a vehicle body and connected to one end of an assist link having the other end mounted at a knuckle and which changes a position of a mounting point of the assist link at the vehicle body, may include a member bracket fixedly mounted at each end of the sub-frame, provided with openings formed at both sides and an upper surface thereof, and formed of a pair of slide grooves having arc shape at the both ends thereof to slidably receive a pair of slide plates therein; an actuator connected to both slide plates through a pin-bolt unit; and a cam-bolt unit assembling a bush of the assist link with both slide plates and setting an initial position of the mounting point of the assist link at the vehicle body.

20 Claims, 11 Drawing Sheets

⟨S1⟩

⟨S2⟩

⟨S3⟩

ACTIVE GEOMETRY CONTROL SUSPENSION SYSTEM AND ACTUATING DEVICE DRIVING THE SAME

CROSS-REFERENCE TO RELATED APPLICATION

The present application claims priority to Korean Patent Application No. 10-2010-0028169 filed in the Korean Intellectual Property Office on Mar. 29, 2010, the entire contents of which is incorporated herein for all purposes by this reference.

BACKGROUND OF THE INVENTION

1. Field of the Invention

The present invention relates to an actuating device for an active control suspension system (AGCS), and more particularly to an actuating device for an active control suspension system which is connected to one end of an assist link having the other end mounted at a knuckle provided at both ends of a sub-frame of a vehicle body and which changes a position of a mounting point of the assist link at the vehicle body.

2. Description of Related Art

Generally, a suspension system for vehicles is disposed between a vehicle body and a wheel and connects two rigid bodies by using a plurality of links. The suspension system includes a spring, a shock absorber, a trailing arm, a knuckle, and a control arm.

Such a suspension system should satisfy basic requisites as follows.

Firstly, the suspension system effectively absorbs irregular vibration generated from a road when a vehicle runs so as to provide ride comfort to passengers.

Secondly, the suspension system controls shake of the vehicle body generated by driving action of a driver and curves of the road so as to provide driving convenience.

Thirdly, the suspension system maintains vertical load applied from the road within a predetermined range so as to secure stability when the vehicle turns or brakes.

Recently, an active control suspension system (AGCS) mounted to a rear suspension has been developed. Such an AGCS changes geometry of the rear suspension for the vehicle by using an electrically operated actuator, and resultantly reduces roll steer and improves grip of a rear wheel when the vehicle turns. Therefore, handling performance of the vehicle may be greatly enhanced.

When the vehicle turns quickly, the vehicle oversteers and controllability may be deteriorated. The active control suspension system causes toe-in of the rear wheel in this case and improves control stability.

FIG. 1 is a perspective view of a conventional active control suspension system.

The conventional active control suspension system is provided with an actuator 103 in both sides of a sub-frame 101, and the actuator 103 is provided with an operating rod 105 moving reciprocally. The operating rod 105 of the actuator 103 is connected to one end of a control lever 109 which is rotatably mounted at the sub-frame 101 through a lever shaft 107.

The other end of the control lever 109 is connected to one end of an assist link 113 through a bush B. The other end of the assist link 113 is mounted at a rear portion of a knuckle 111 through a ball joint BJ. Therefore, a connecting point between the control lever 109 and the assist link 113 forms a mounting point P of the assist link 113 at the vehicle body.

The active control suspension system causes toe-in of an outboard rear wheel 115 with respect to a turning axis which bumps when the vehicle turns.

That is, if the control lever 109 rotates by an operation of the actuator 103, the mounting point P of the assist link 113 at the vehicle body moves downwardly and toe-in of the outboard rear wheel 115 with respect to the turning axis increases. Therefore, turning stability of the vehicle may be improved and stable driving performance of the vehicle may be achieved when the vehicle turns quickly, the lateral wind blows, or the vehicle changes its lane quickly.

Since the conventional active control suspension system uses the control lever 109 between the actuator 103 and the assist link 113 as power delivery means, weight and cost may be raised.

In addition, since external force is directly transmitted to the actuator 103 through the assist link 113 and the control lever 109, durability may be deteriorated.

In addition, the control lever 109 is rotated only by a driving torque of the actuator 103, and the actuator 103 should generate the driving torque corresponding to lateral force transmitted through the assist link 113 according to movements of the vehicle. Therefore, the actuator 103 of large capacity should be used and accordingly it is difficult to design a layout of the suspension system.

Since the driving torque of the actuator 103 is transmitted to the assist link 113 through the rotation of the control lever 109, a wheel tread may be changed.

In addition, since the conventional active control suspension system uses a toe control screw 117 on the assist link 113 so as to set and control an initial toe, additional manufacture and assembly processes may be added.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an actuating device for an active control suspension system having advantages of reducing weight and cost as a consequence that each slide plate is moved upwardly or downwardly along each slide groove formed at each side of a member bracket of a vehicle body by vertical driving torque of an actuator and the slide plate transmits the vertical driving torque of the actuator to the assist link.

In addition, another objective of the present invention is that durability of the actuator may be maintained and capacity of the actuator may be minimized by preventing external force from being directly transmitted to the actuator through the assist link.

Other objective of the present invention is that change in a wheel tread may be minimized and the vehicle body may be controlled optimally by forming the slide groove as arc shape such that a trace of the slide plate follows a circular arc having a rotation center at a connecting point of the assist link to a rear wheel.

Other objective of the present invention is that an initial toe can be set and controlled without a toe control screw mounted on the assist link by using an eccentric cam-bolt unit for assembling a bush of the assist link with both slide plates.

An actuating device for an active control suspension system according to an exemplary embodiment of the present invention may be provided at both ends of a sub-frame of a vehicle body and connected to one end of an assist link having the other end mounted at a knuckle and may change a position of a mounting point of the assist link at the vehicle body.

The actuating device may include a member bracket fixedly mounted at each end of the sub-frame, provided with openings formed at both sides and an upper surface thereof, and formed of a pair of slide grooves having arc shape at the both ends thereof so as to slidably receive a pair of slide plates, an actuator mounted vertically on the sub-frame corresponding to the upper surface of the member bracket and connected to both slide plates through a pin-bolt unit so as to transmit a vertical driving torque thereto, and a cam-bolt unit assembling a bush of the assist link with both slide plates and setting an initial position of the mounting point of the assist link at the vehicle body.

Protecting caps may be mounted respectively at the both sides and a front surface of the member bracket.

Each side opening may be formed at a middle portion of each slide groove, and the slide groove may be formed as the arc shape along a circular arc direction having a rotation center at a connecting point of the assist link to a rear wheel.

Each side opening may be formed at the middle portion of the slide groove along the circular arc direction.

The slide plate may have oval shape curved along the circular arc direction, be formed of a pin hole for mounting the pin-bolt unit at an upper portion thereof, and be formed of a cam groove of oval shape for mounting the cam-bolt unit at a lower portion of a front surface. The cam groove may be stepped inwardly and be provided with a slot hole formed transversely at a middle portion thereof. The slide plate may be provided with a rib at a rear surface which may be protruded along a circumference of the slot hole and inserted in each side opening formed at each side of the member bracket.

A metal bearing may be integrally formed with the slide plate at an external circumference thereof contacted with the slide groove and each side opening of the member bracket and a circumference of the rib, and an interior circumference of the pin hole.

The pin-bolt unit may include a pin bolt having both end portions inserted in the pin hole of each slide plate through both side openings of the member bracket in a state of being inserted in a front end of an operating rod of the actuator in the member bracket, and formed of fixing pin holes at both end portions, pin nuts engaged to both ends of the pin bolt from an exterior of each slide plate, and fixing pins inserted in each fixing pin hole.

A connecting hole of slot shape may be formed at the front end of the operating rod of the actuator, and a gap may be formed along a width direction of the connecting hole between the pin bolt and the connecting hole when the pin bolt may be inserted in the connecting hole.

The cam-bolt unit may include a cam bolt, a cam nut engaged to a front end of the cam bolt, and front and rear cam plates eccentric to an axis of the cam bolt, disposed respectively at a head portion and a front end portion, and inserted respectively in each cam groove of each slide plate, wherein the cam bolt may be engaged to the cam nut in a state of being inserted in the slot hole formed at the middle portion of the cam groove such that the bush of the assist link may be assembled between the both slide plates.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
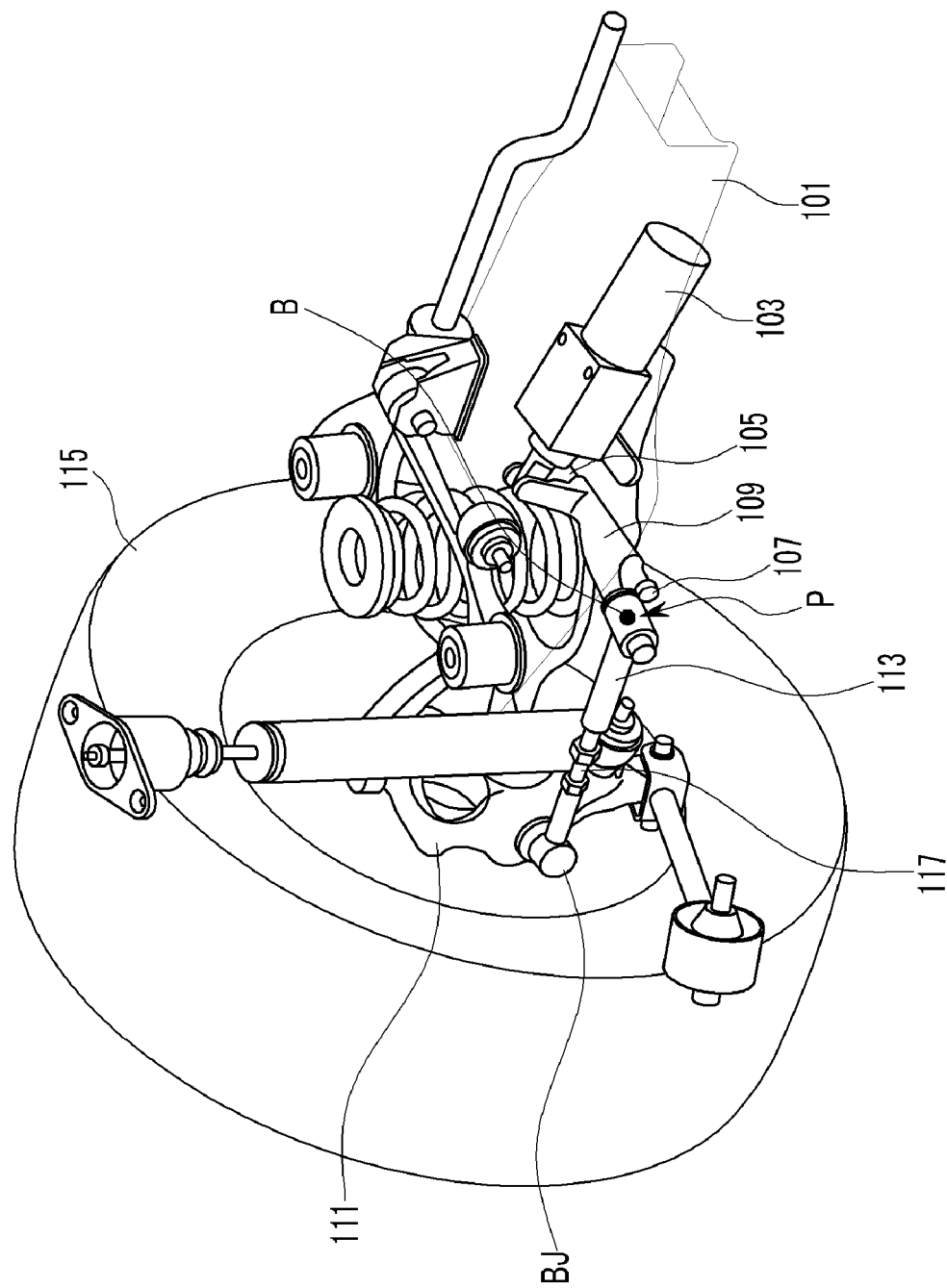
FIG. 1 is a perspective view of a conventional active control suspension system.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the attached drawings.

Figure 2:
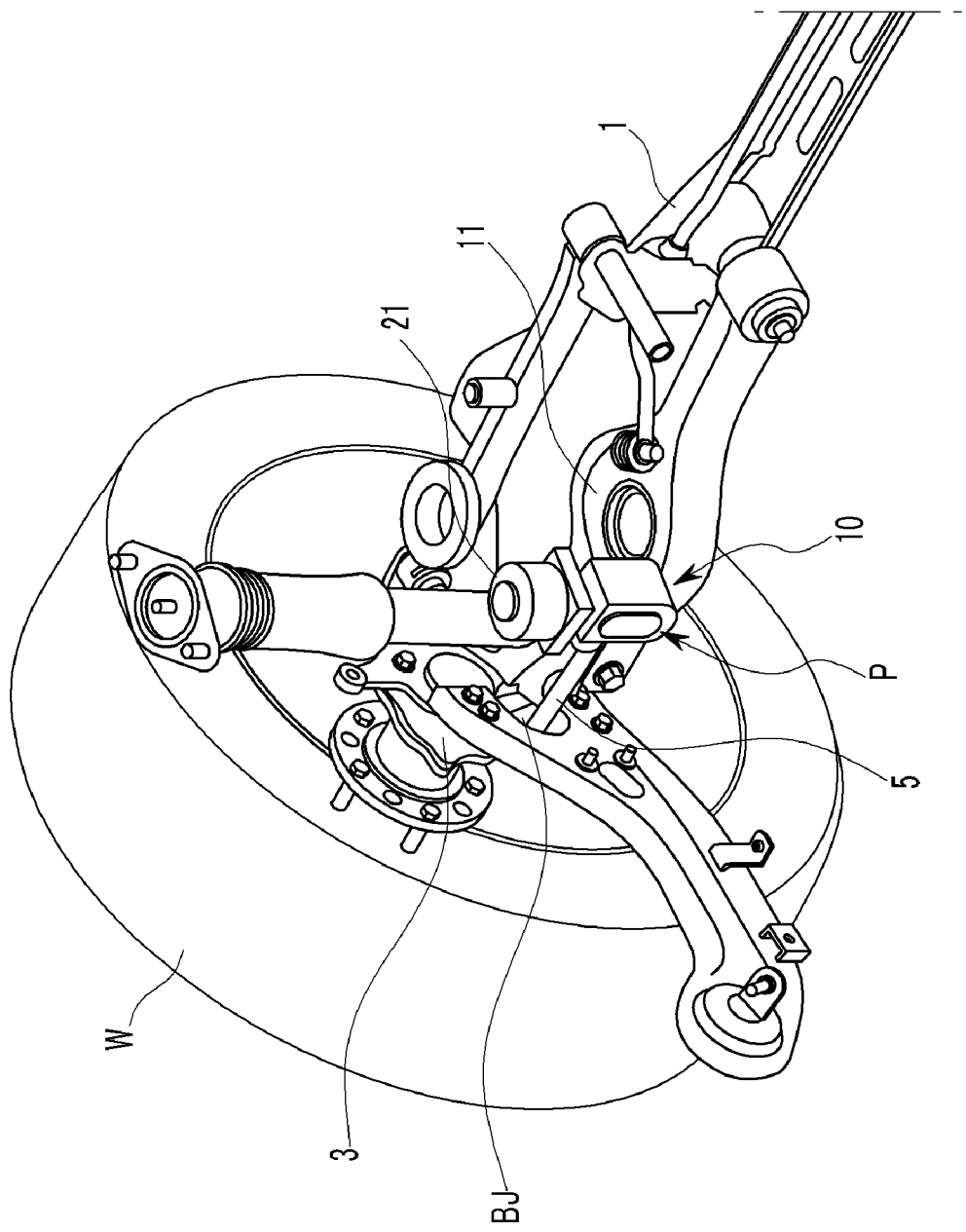
FIG. 2 is a perspective view showing a part of an active control suspension system having an actuating device according to an exemplary embodiment of the present invention.

FIG. 2 is a perspective view showing a part of an active control suspension system having an actuating device according to an exemplary embodiment of the present invention.

An active control suspension system including an actuating device 10 according to the present exemplary embodiment is provided at each side of a sub-frame 1 of a vehicle body, and connected to one end of an assist link 5 having the other end mounted at a knuckle 3 through a ball joint BJ. The actuating device 10 changes a position of a mounting point P of the assist link 5 at the vehicle body.

Figure 3:
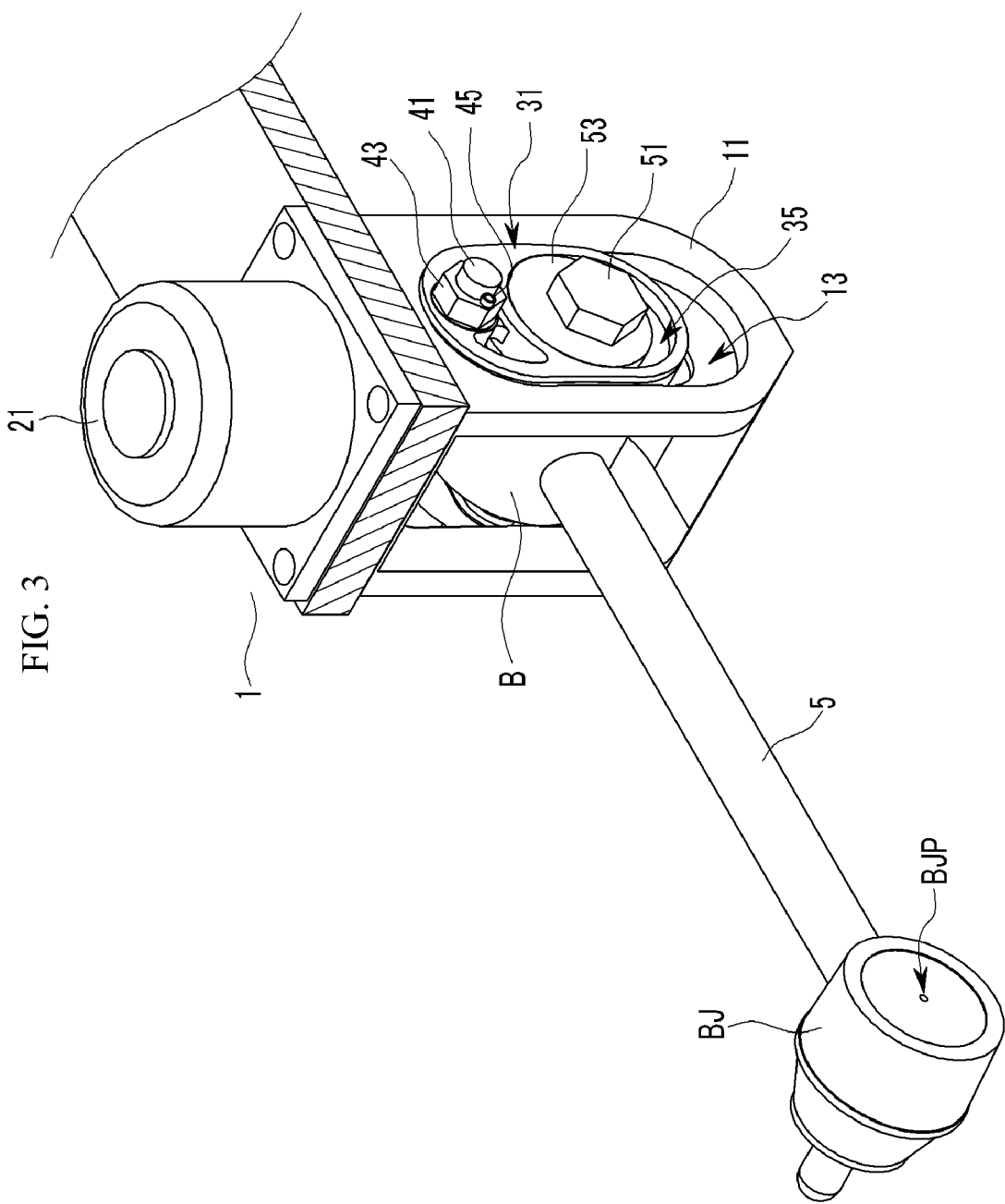
FIG. 3 is a perspective view of an actuating device according to an exemplary embodiment of the present invention.
Figure 4:
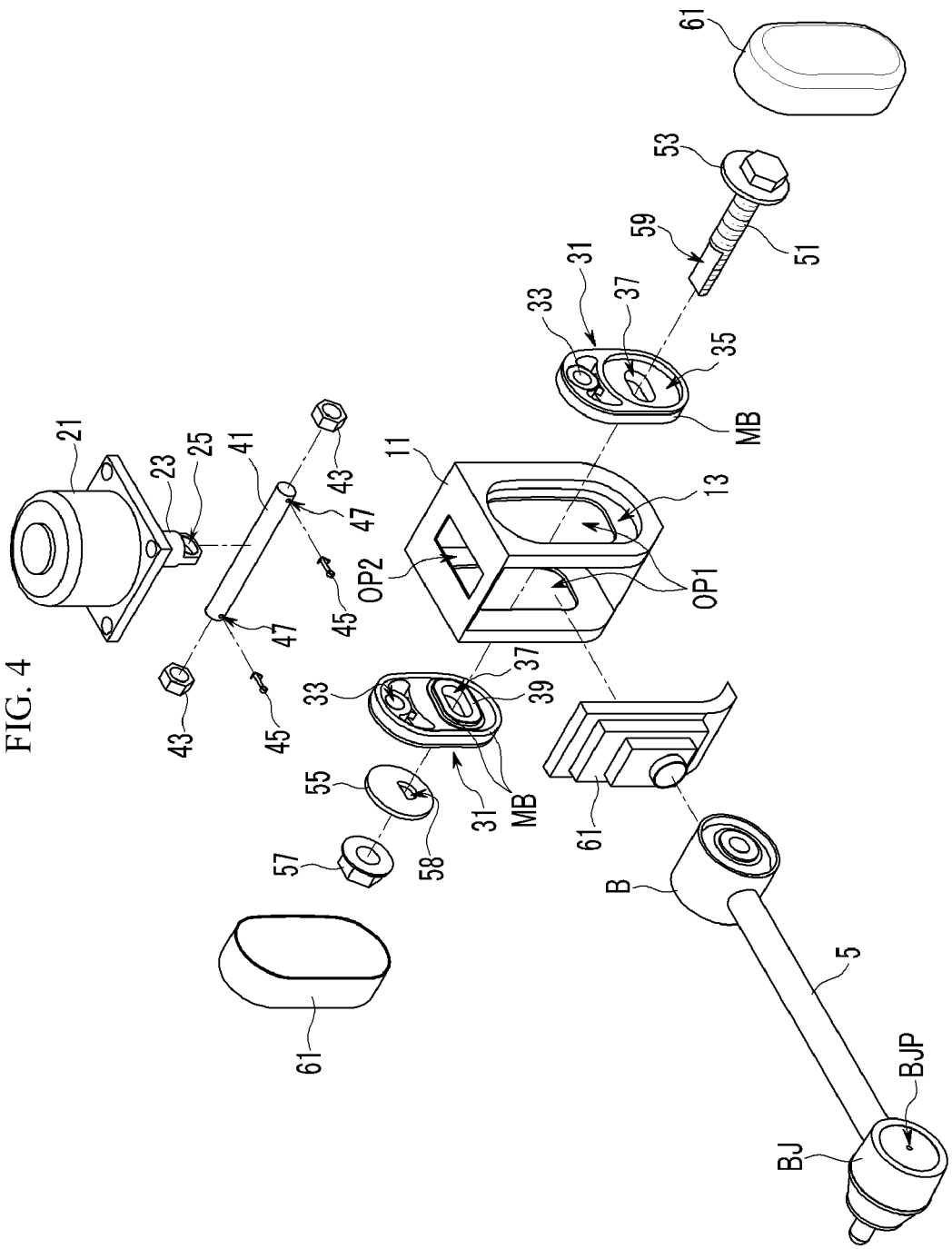
FIG. 4 is an exploded perspective view of an actuating device according to an exemplary embodiment of the present invention.

Such an actuating device 10, as shown in FIG. 3 and FIG. 4, includes a member bracket 11 and an actuator 21.

The member bracket 11 is fixedly mounted at each side of the sub-frame 1 so as to transmit a vertical driving torque of the actuator 21 to the assist link 5.

The member bracket 11 is provided with openings OP1 and OP2 respectively at both sides and an upper surface thereof. The both sides of the member bracket 11 are stepped inwardly and a slide groove 13 of arc shape is formed at each stepped portion. Each side opening OP1 is formed at a middle portion of each slide groove 13.

Figure 5:
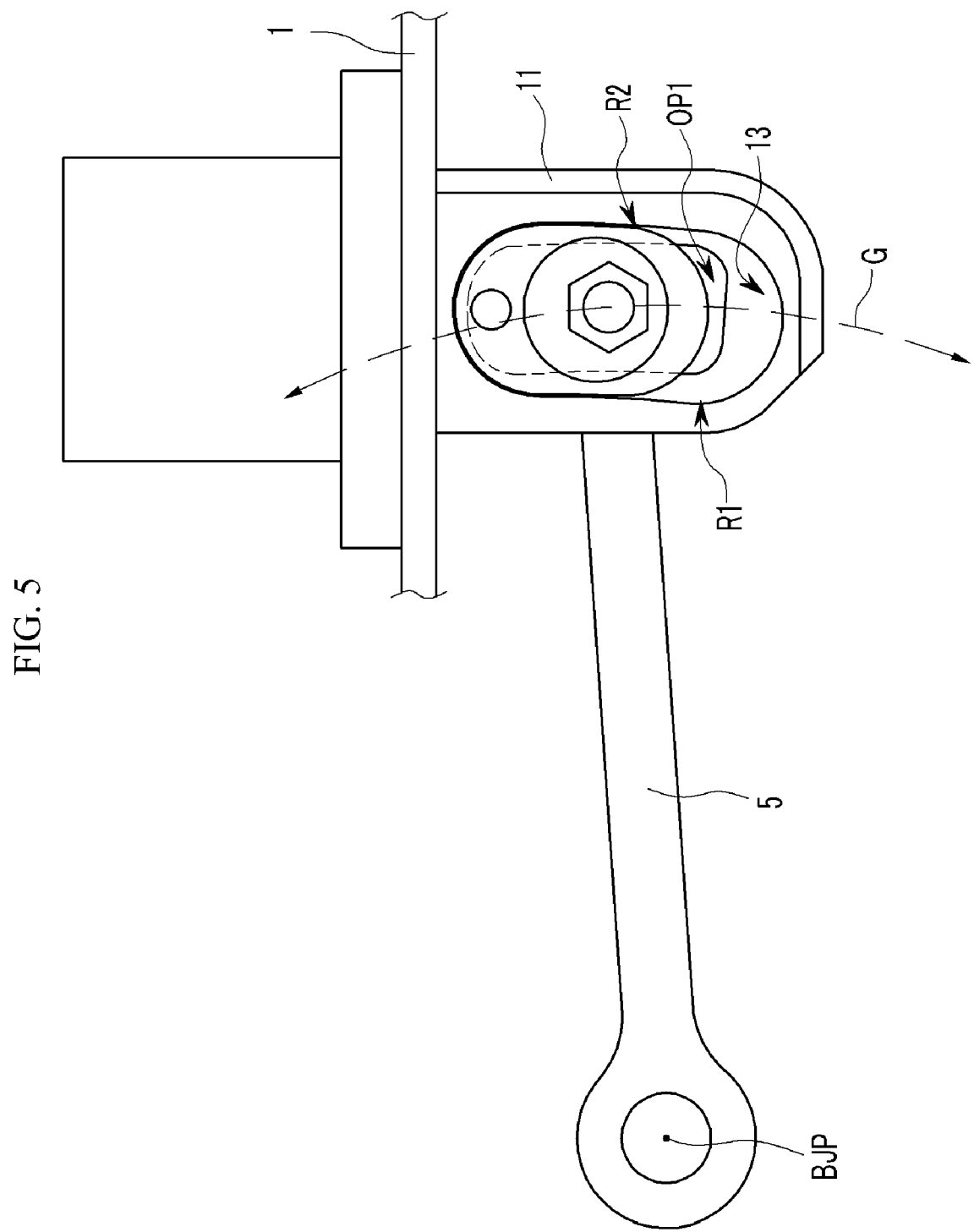
FIG. 5 is a front view of an actuating device according to an exemplary embodiment of the present invention.

Each slide groove 13, as shown in FIG. 5, is formed as the arc shape along a trace G of a circular arc direction having a rotation center at a connecting point (i.e., ball joint point, BJP) of the assist link 5 to a rear wheel. In addition, each side opening OP1 is formed at the middle portion of the slide groove 13 along the trace G of the circular arc direction.

Figure 6:
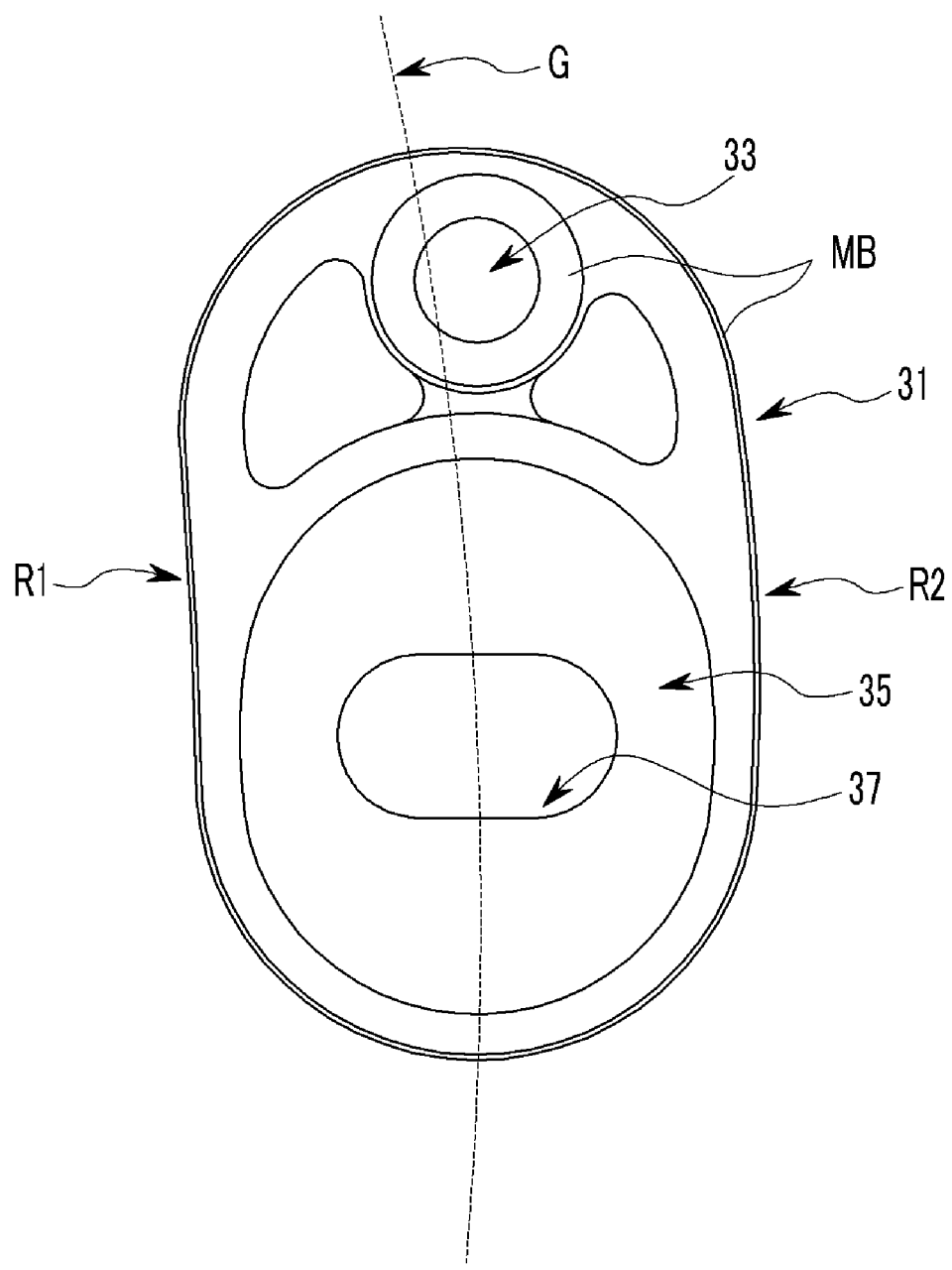
FIG. 6 to FIG. 8 are a front view, a front perspective view, and a rear perspective view of a slide plate used in an actuating device for an active control suspension system according to an exemplary embodiment of the present invention.

A slide plate 31 is slidably mounted in the slide groove 13. The slide plate 31, as shown in FIG. 6, has oval shape. Both sides R1 and R2 of the slide plate 31 are curved along the trace G of the circular arc direction.

Figure 7:
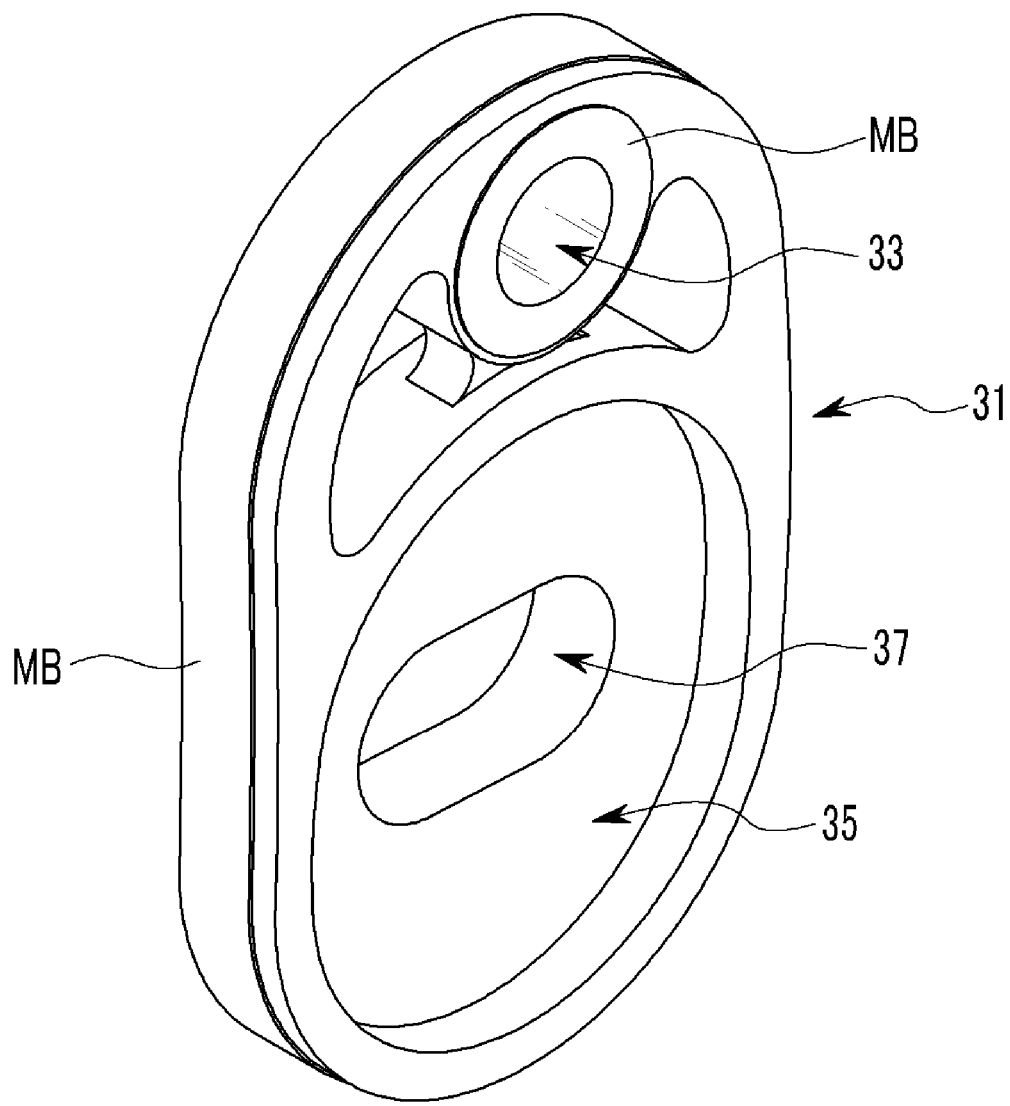
Figure 8:
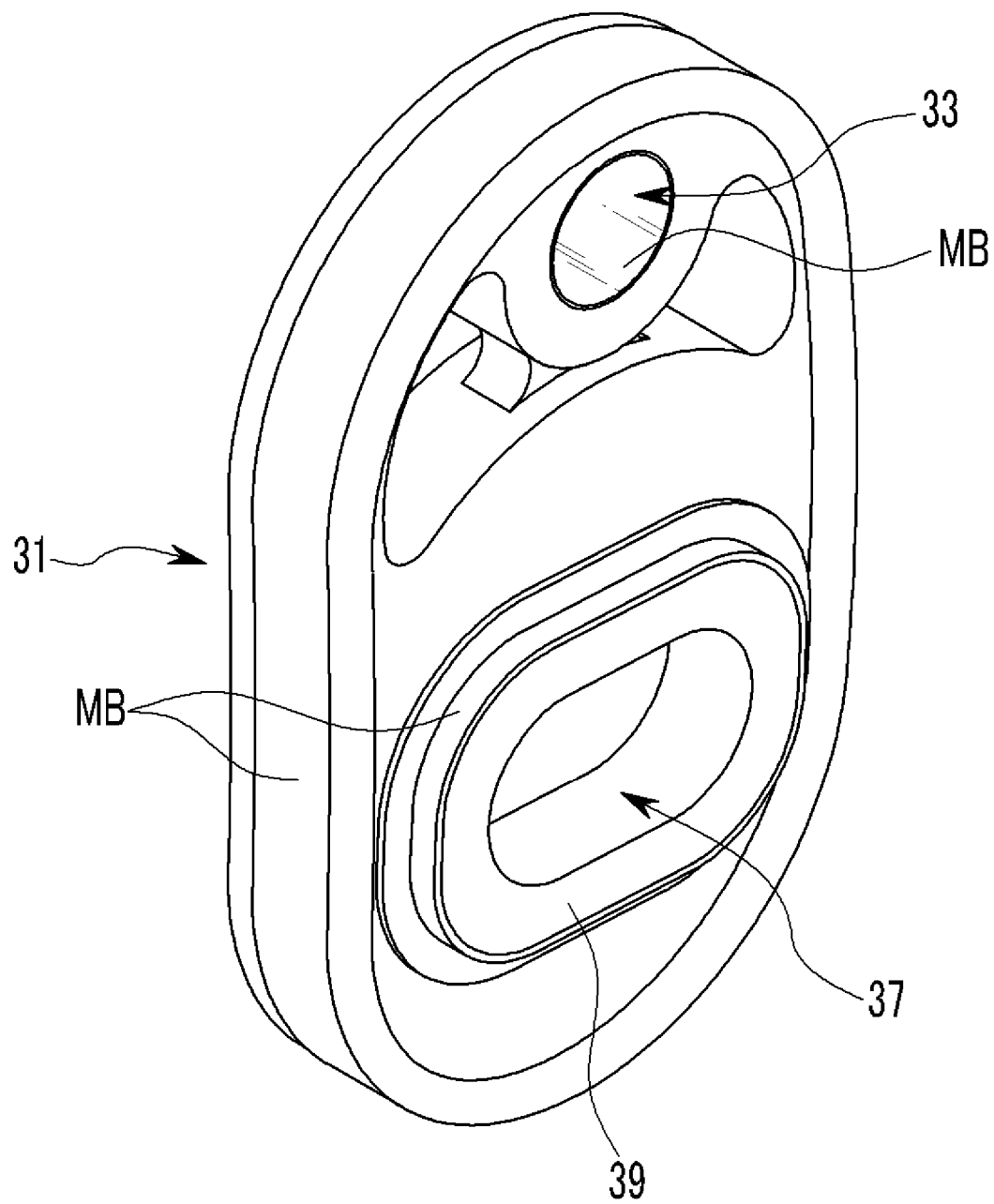

The slide plate 31, as shown in FIG. 7 and FIG. 8, is provided with a pin hole 33 formed at an upper portion thereof and a cam groove 35 stepped inwardly and formed at a lower portion of a front surface. The cam groove 35 has oval shape and a slot hole 37 is formed transversely at a middle portion of the cam groove 35. In addition, a rib 39 is integrally formed at a rear surface of the slide plate 31. The rib 39 is protruded to the rear along a circumference of the slot hole 37 and is inserted in each side opening OP1 formed at the member bracket 11.

A metal bearing MB is integrally formed with the slide plate 31 at an external circumference thereof contacted with the slide groove 13 and each side opening OP1 of the member bracket 11, a circumference of the rib 39, and an interior circumference of the pin hole 33 so as to reduce friction coefficient with the member bracket 11.

Meanwhile, the actuator 21 is mounted vertically on the sub-frame 1 corresponding to the upper surface of the member bracket 11. The actuator 21 is connected to the slide plate 31 through a pin-bolt unit so as to transmit the vertical driving torque to the slide plate 31.

The pin-bolt unit, as shown in FIG. 4, includes a pin bolt 41, a pin nut 43, and a fixing pin 45. Assembling structures of the actuator 21 and both slide plates 31 through the pin-bolt unit will be described in detail In a state that the pin bolt 41 is inserted in a front end of the operating rod 23 of the actuator 21 in the member bracket 11, both end portions of the pin bolt 41 penetrate through the side openings OP1 of the member bracket 11 and are inserted in each pin hole 33 of each slide plate 31.

Fixing pin holes 47 for mounting the fixing pins 45 are formed at both end portions of the pin bolt 41.

In addition, both ends of the pin bolt 41 penetrate through and are protruded from each slide plate 31, and the pin nuts 43 are engaged respectively to the protruded both ends. In this state, each fixing pin 45 is inserted in each fixing pin hole 47 so as to prevent each pin nut 43 from being disengaged.

Figure 9:
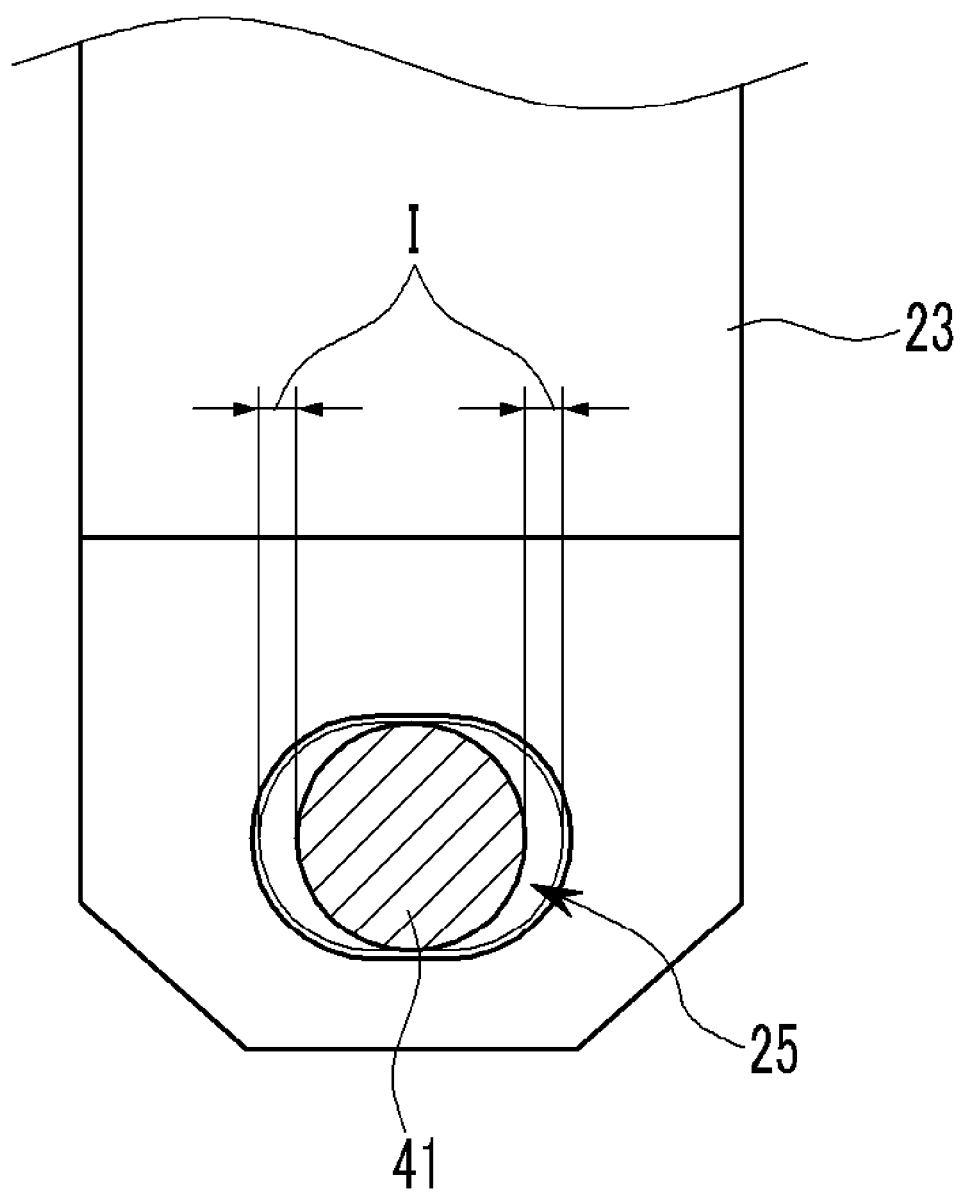
FIG. 9 is a cross-sectional view showing a connecting portion of a pin bolt and an actuator operating rod used in an actuating device for an active control suspension system according to an exemplary embodiment of the present invention.

Herein, a connecting hole 25 is formed at the front end of the operating rod 23 of the actuator 21 as shown in FIG. 9, and the pin bolt 41 is inserted in the connecting hole 25. At this time, the connecting hole 25 is formed as slot shape such that a gap I is formed along a width direction thereof between the pin bolt 41 and the connecting hole 25 when the pin bolt 41 is inserted in the connecting hole 25.

In addition, a bush B formed at the other end of the assist link 5 is assembled to the both slide plates 31 through a cam-bolt unit such that an initial position of the mounting point P of the assist link 5 at the vehicle body and accordingly an initial toe can be set.

That is, the cam-bolt unit, as shown in FIG. 4, includes a cam bolt 51 and front and rear cam plates 53 and 55 eccentric to an axis of the cam bolt 51 and disposed respectively at a head portion and a front end portion. The front and rear cam plates 53 and 55 are inserted respectively in each cam groove 35 formed at the lower portion of the front surface of each slide plate 31. At this time, a cam nut 57 is engaged to the cam bolt 51 in a state that the cam bolt 51 is inserted in the slot hole 37 formed at the middle portion of the cam groove 35 of each slide plate 31.

Herein, the front cam plate 53 is integrally formed with the head portion of the cam bolt 51, and the rear cam plate 55 is separately formed from the cam bolt 51. The rear cam plate 55 is provided with a fixing hole 58 in which a fixing surface 59 formed at a front end portion of the cam bolt 51 along an axial direction thereof. Therefore, the front end portion of the cam bolt 51 and the fixing hole 58 have semi-circular shape so as to prevent a relative rotation of the cam bolt 51 and the rear cam plate 55.

Assembling structures of the assist link 5 and both slide plates 31 through the cam-bolt unit will be described in detail.

Firstly, in a state that the bush B of the assist link 5 is inserted through a front surface of the member bracket 11 and is positioned between the both slide plates 31, the cam bolt 51 is inserted in the slot holes 37 of the both slide plates 31 and both side openings OP1 of the member bracket 11.

At this time, the front cam plate 53 is inserted in the cam groove 35 formed at one slide plate 31, and the rear cam plate 55 is inserted in the front end portion of the cam bolt 51 so as to be inserted in the cam groove 35 formed at the other slide plate 31. After that, the cam nut 57 is threaded to the front end portion of the cam bolt 51.

Figure 10:
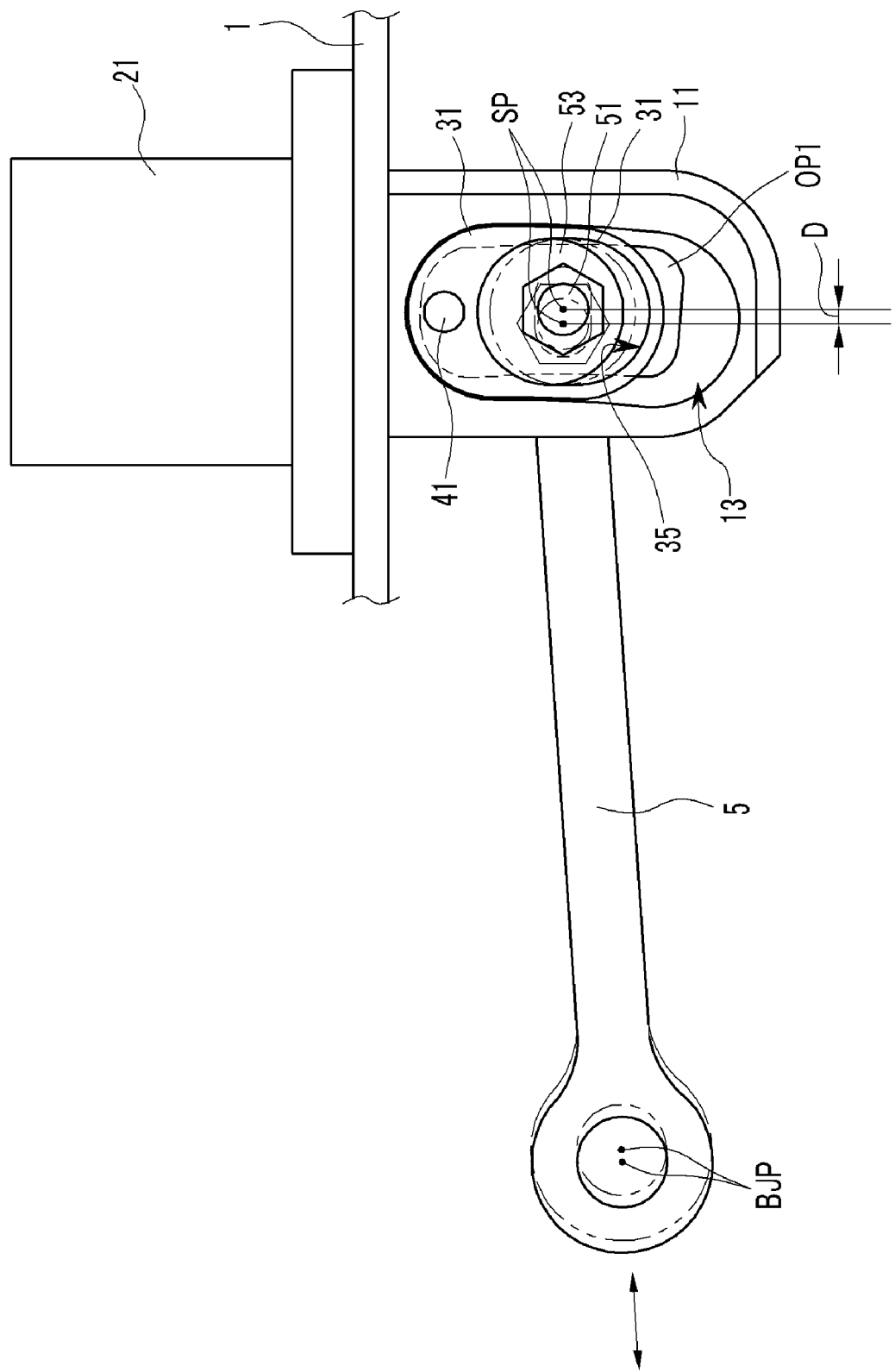
FIG. 10 is a schematic drawing showing an operation of a cam-bolt unit used in an actuating device for an active control suspension system according to an exemplary embodiment of the present invention.

In order to set the initial position of the mounting point P of the assist link 5 at the vehicle body by using the cam-bolt unit, the head portion of the cam bolt 51, as shown in FIG. 10, is rotated in a state that the cam bolt 51 and the cam nut 57 are assembled such that an axial center SP of the cam bolt 51 can be moved within a predetermined range 2D in the slot hole 37 by operations of the front and rear cam plates 53 and 55 to each cam groove 35 of each slide plate 31.

If the mounting point P of the assist link at the vehicle body is set, the initial toe of the rear wheel W can be set according to the initial position of the mounting point P of the assist link 5 at the vehicle body. In this state, the cam nut 57 is completely engaged to the cam bolt 51 so as to complete an assembling of the bush B of the assist link 5 to the both slide plates 31.

Meanwhile, since foreign materials or contaminants can be flowed in the member bracket 11 through the openings formed at the front surface and the both sides and the actuating device can be out of order, protecting caps 61 are mounted at the front surface and the both sides.

According to an exemplary embodiment of the present invention, a control lever driven by a conventional actuator can be removed. In addition, the mounting point P of the assist link 5 at the vehicle body moves by the vertical driving torque of the actuator 21 along the trace G of the circular arc direction having the rotation center at the connecting point BJP of the assist link 5 to the rear wheel W. Therefore, the assist link 5 can be smoothly lowered without a change in wheel tread and toe-in of the outboard rear wheel W with respect to a turning axis can increase.

That is, when the rear wheel W of the vehicle bumps by quick turn of the vehicle, lateral wind, or quick lane change, a controller outputs a forward-driving signal to the actuator 21 corresponding to the outboard rear wheel W with respect to the turning axis according to a rotation speed of a steering wheel and a vehicle speed.

Accordingly, the both slide plates 31 are lowered on the slide grooves 13 of the member bracket 11 along the trace G of the circular arc direction and the mounting point P of the assist link 5 at the vehicle body is moved downwardly.

Therefore, the toe-in of the outboard rear wheel W with respect to the turning axis increases, and the vehicle understeers. Therefore, turning stability of the vehicle may be enhanced.

Figure 11:
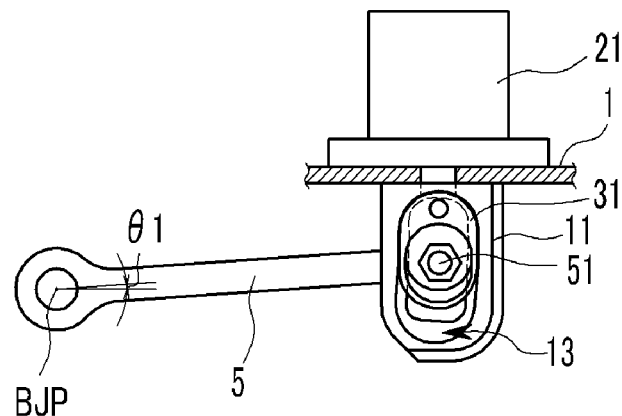
FIG. 11 is a schematic drawing showing an operation of an assist link at each vehicle condition according to an exemplary embodiment of the present invention.
Figure 11:
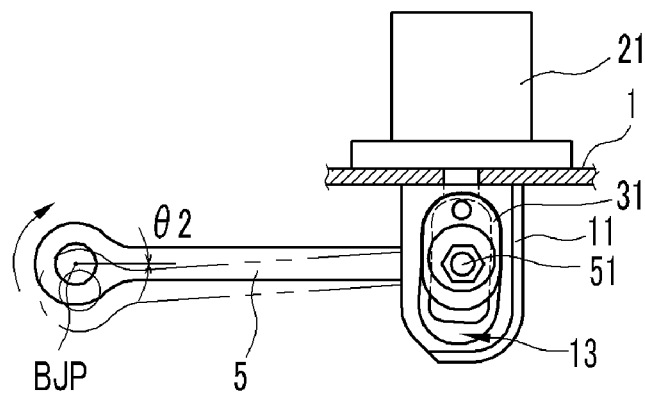
Figure 11:
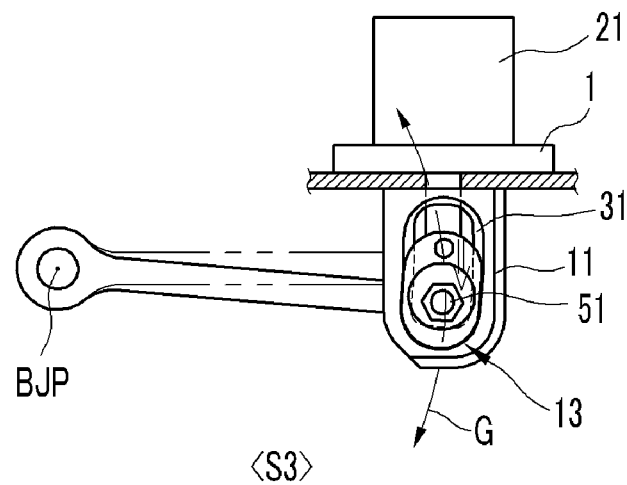

FIG. 11 is a schematic drawing showing an operation of an assist link at each vehicle condition according to an exemplary embodiment of the present invention.

A mounting angle θ1 of the assist link 5 at an initial wheel alignment state is shown in S1, a moving angle θ2 of the assist link 5 in an actual moving condition of the vehicle is shown in S2, and it is shown in S3 that the mounting point P of the assist link 5 at the vehicle body is moved along the trace G of the circular arc direction having the rotation center at the connecting point BJP of the assist link 5 to the rear wheel W when the active control suspension system according to the present exemplary embodiment is operated.

If the mounting point P of the assist link 5 at the vehicle body is moved along the trace G of the circular arc direction, the wheel tread is nearly changed and smooth operation of the active control suspension system is achieved.

Since each slide plate is moved upwardly or downwardly along each slide groove formed at each side of a member bracket of a vehicle body by vertical driving torque of an actuator and the slide plate transmits the vertical driving torque of the actuator to the assist link, weight and cost may be reduced.

In addition, durability of the actuator may be maintained and capacity of the actuator may be minimized by preventing external force from being directly transmitted to the actuator through the assist link.

In addition, change in a wheel tread may be minimized and the vehicle body may be controlled optimally by forming the slide groove as arc shape such that a trace of the slide plate follows a circular arc having a rotation center at a connecting point of the assist link to a rear wheel.

In addition, an initial toe can be set and controlled without a toe control screw mounted on the assist link by using an eccentric cam-bolt unit for assembling a bush of the assist link with both slide plates.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An actuating device for an active control suspension system which is provided at both ends of a sub-frame of a vehicle body and connected to one end of an assist link having the other end mounted at a knuckle and which changes a position of a mounting point of the assist link at the vehicle body, the actuating device comprising:
   a member bracket fixedly mounted at each end of the sub-frame, provided with openings formed at both sides and an upper surface thereof, and formed of a pair of slide grooves having arc shape at the both ends thereof so as to slidably receive a pair of slide plates therein;
   an actuator mounted vertically on the sub-frame corresponding to the upper surface of the member bracket and connected to both slide plates through a pin-bolt unit so as to transmit a vertical driving torque thereto; and
   a cam-bolt unit assembling a bush of the assist link with both slide plates and setting an initial position of the mounting point of the assist link at the vehicle body.

2. The actuating device of claim 1, wherein protecting caps are mounted respectively at the both sides and a front surface of the member bracket.

3. The actuating device of claim 1, wherein each side opening is formed at a middle portion of each slide groove, and the slide groove is formed as the arc shape along a circular arc direction having a rotation center at a connecting point of the assist link to a rear wheel.

4. The actuating device of claim 3, wherein each side opening is formed at the middle portion of the slide groove along the circular arc direction.

5. The actuating device of claim 3, wherein the slide plate has oval shape curved along the circular arc direction, formed of a pin hole for mounting the pin-bolt unit at an upper portion thereof, and formed of a cam groove of oval shape for mounting the cam-bolt unit at a lower portion of a front surface,
   wherein the cam groove is stepped inwardly and is provided with a slot hole formed transversely at a middle portion thereof, and
   wherein the slide plate is provided with a rib at a rear surface which is protruded along a circumference of the slot hole and inserted in each side opening formed at each side of the member bracket.

6. The actuating device of claim 5, wherein a metal bearing is integrally formed with the slide plate at an external circumference thereof contacted with the slide groove and each side opening of the member bracket and a circumference of the rib, and an interior circumference of the pin hole.

7. The actuating device of claim 5, wherein the pin-bolt unit comprises:
   a pin bolt having both end portions inserted in the pin hole of each slide plate through both side openings of the member bracket in a state of being inserted in a front end of an operating rod of the actuator in the member bracket, and formed of fixing pin holes at both end portions;
   pin nuts engaged to both ends of the pin bolt from an exterior of each slide plate; and
   fixing pins inserted in each fixing pin hole.

8. The actuating device of claim 7, wherein a connecting hole of slot shape is formed at the front end of the operating rod of the actuator, and a gap is formed along a width direction of the connecting hole between the pin bolt and the connecting hole when the pin bolt is inserted in the connecting hole.

9. The actuating device of claim 5, wherein the cam-bolt unit comprises:
a cam bolt;
a cam nut engaged to a front end of the cam bolt; and
front and rear cam plates eccentric to an axis of the cam bolt, disposed respectively at a head portion and a front end portion, and inserted respectively in each cam groove of each slide plate,
wherein the cam bolt is engaged to the cam nut in a state of being inserted in the slot hole formed at the middle portion of the cam groove such that the bush of the assist link is assembled between the both slide plates.

10. An active geometry control suspension system which is provided at both ends of a sub-frame of a vehicle body and connected to one end of an assist link having the other end mounted at a knuckle and which changes a position of a mounting point of the assist link at the vehicle body,
wherein the active geometry control suspension system is provided with an actuating device of claim 1.

11. An actuating device for an active control suspension system which is provided at both ends of a sub-frame of a vehicle body and connected to one end of an assist link having the other end mounted at a knuckle and which changes a position of a mounting point of the assist link at the vehicle body, the actuating device comprising:
a member bracket provided with openings formed at both sides and an upper surface thereof, having a pair of slide grooves formed in the both sides and along a circular arc direction having a rotation center at a connecting point of the assist link to a rear wheel, and fixedly mounted at each end of the sub-frame;
a slide plate provided with a pin hole at an upper portion thereof and a cam groove which has oval shape and is stepped inwardly at a lower portion of a front surface, and slidably mounted in each slide groove, a slot hole being formed transversely at a middle portion of the cam groove;
an actuator mounted vertically on the sub-frame corresponding to the upper surface of the member bracket;
a pin-bolt unit having both ends inserted in the pin hole of each slide plate through both side openings of the member bracket in a state of being inserted in a front end of an operating rod of the actuator in the member bracket; and
a cam-bolt unit inserted through a slot hole of each slide plate and the both side opening of the member bracket so as to assemble a bush of the assist link with the both slide plates and setting an initial position of the mounting point of the assist link at the vehicle body.

12. The actuating device of claim 11, wherein protecting caps are mounted respectively at the both sides and a front surface of the member bracket.

13. The actuating device of claim 11, wherein each side opening is formed at the middle portion of the slide groove along the circular arc direction.

14. The actuating device of claim 11, wherein the slide plate has oval shape curved along the circular arc direction corresponding to curvature of the slide groove.

15. The actuating device of claim 11, wherein the slide plate is integrally formed with a rib protruded along a circumference of the slot hole and inserted in each side opening formed at the member bracket.

16. The actuating device of claim 15, wherein a metal bearing is integrally formed with the slide plate at an external circumference thereof contacted with the slide groove and each side opening of the member bracket and a circumference of the rib, and an interior circumference of the pin hole.

17. The actuating device of claim 11, wherein the pin-bolt unit comprises:
a pin bolt having both end portions inserted in the pin hole of each slide plate through both side openings of the member bracket in a state of being inserted in a front end of an operating rod of the actuator in the member bracket, and formed of fixing pin holes at both end portions;
pin nuts engaged to both ends of the pin bolt from an exterior of each slide plate; and
fixing pins inserted in each fixing pin hole.

18. The actuating device of claim 17, wherein a connecting hole of slot shape is formed at the front end of the operating rod of the actuator, and a gap is formed along a width direction of the connecting hole between the pin bolt and the connecting hole when the pin bolt is inserted in the connecting hole.

19. The actuating device of claim 11, wherein the cam-bolt unit comprises:
a cam bolt;
a cam nut engaged to a front end of the cam bolt; and
front and rear cam plates eccentric to an axis of the cam bolt, disposed respectively at a head portion and a front end portion, and inserted respectively in each cam groove of each slide plate,
wherein the cam bolt is engaged to the cam nut in a state of being inserted in the slot hole formed at the middle portion of the cam groove such that the bush of the assist link is assembled between the both slide plates.

20. An active geometry control suspension system which is provided at both ends of a sub-frame of a vehicle body and connected to one end of an assist link having the other end mounted at a knuckle and which changes a position of a mounting point of the assist link at the vehicle body,
wherein the active geometry control suspension system is provided with an actuating device of claim 11.

* * * * *